United States Patent [19]

Morgan, Jr.

[11] Patent Number: 4,574,742

[45] Date of Patent: Mar. 11, 1986

[54] LIVESTOCK TAIL DATA INDICATOR

[76] Inventor: Charles Morgan, Jr., Rte. 1, College Grove, Tenn. 37046

[21] Appl. No.: 661,139

[22] Filed: Oct. 15, 1984

[51] Int. Cl.⁴ .................... A01K 13/00; A01K 29/00
[52] U.S. Cl. ..................................... 119/156; 40/300
[58] Field of Search ................ 119/105, 156; 40/300, 40/304

[56] References Cited

U.S. PATENT DOCUMENTS

| | | | |
|---|---|---|---|
| 924,946 | 6/1909 | Taylor | 40/300 |
| 1,011,911 | 12/1911 | Burgess | 40/302 |
| 2,662,321 | 12/1953 | Stoffel | 40/302 X |
| 3,900,981 | 8/1975 | Nichols | 40/300 |
| 4,355,599 | 10/1982 | Fickes et al. | 119/156 X |
| 4,428,327 | 1/1984 | Steckel | 119/156 |
| 4,506,630 | 3/1985 | Hair | 119/156 |

Primary Examiner—Robert P. Swiatek
Attorney, Agent, or Firm—Abe Hatcher

[57] ABSTRACT

A plastic or like indicator for containing livestock treatment data has at one end thereof a flexible fastener of either an injury-proof snap-tight or lock-band type for encircling the tail near its bushy end. To prevent detachment the tag has a second fastener at its other end with parallel members thereof adapted to be bent and fastened together so as to hold tail hairs tightly therebetween. The indicator may contain a color-coded label adhered thereto to show, for example, dry and lactating milk cows. It may have thereon an insecticide compartment. These and other indicator components such as the label may be parts of a kit which may also contain a marker and can or syringe for putting insecticide into the compartment.

20 Claims, 19 Drawing Figures

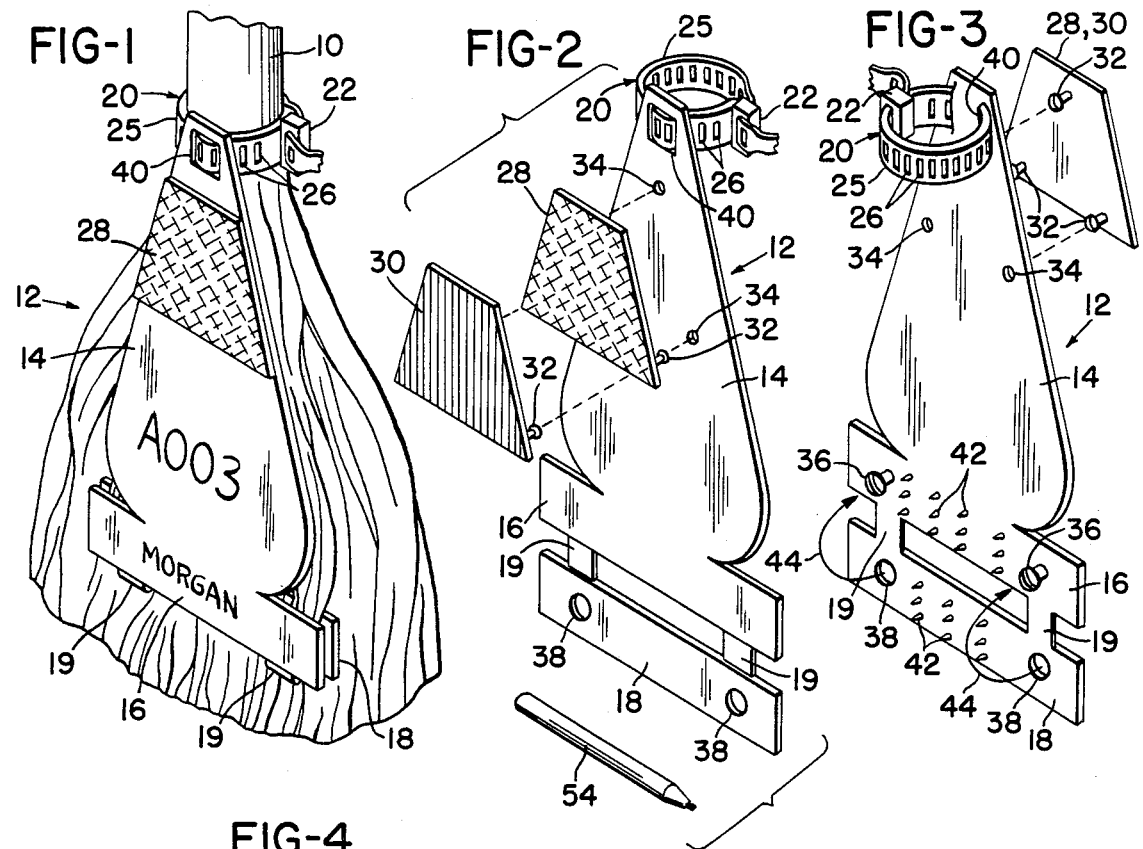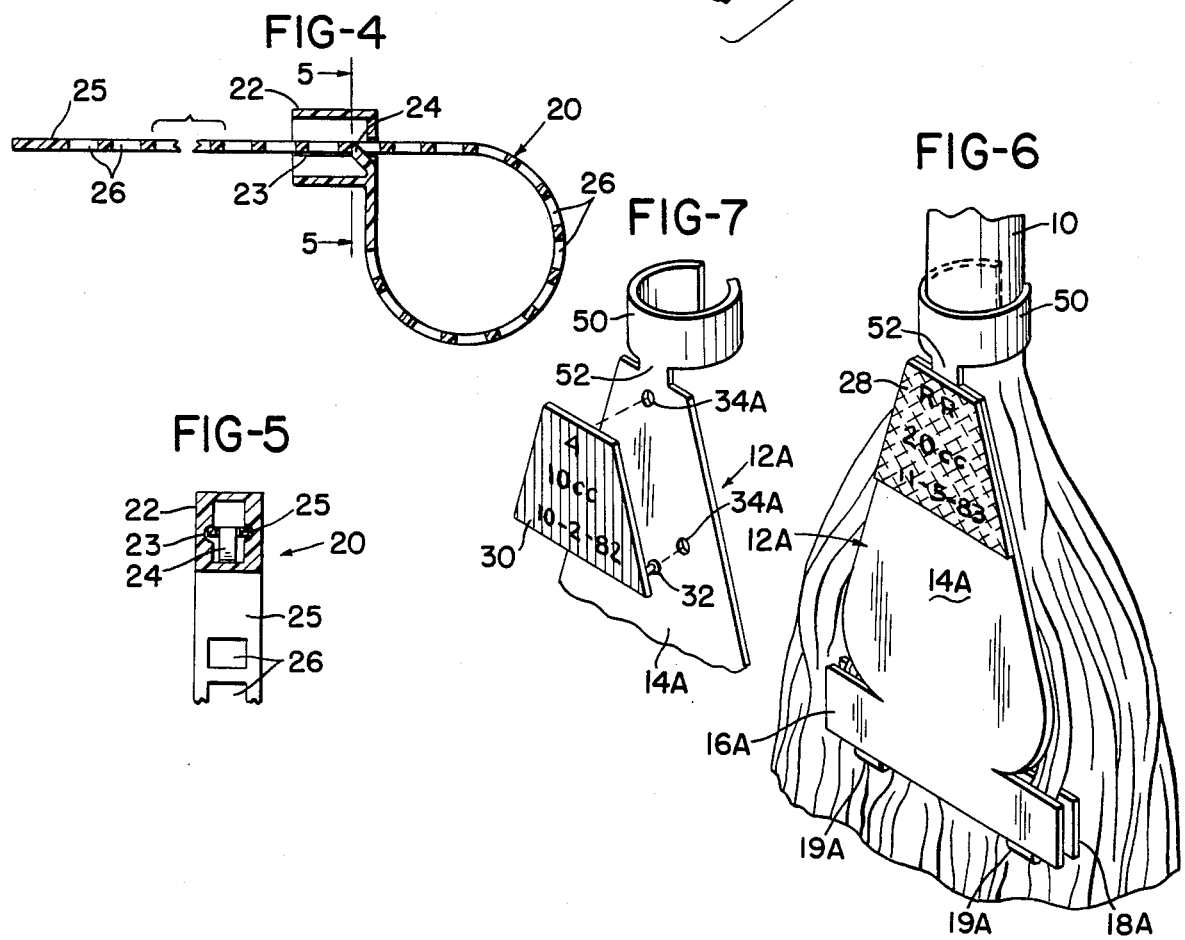

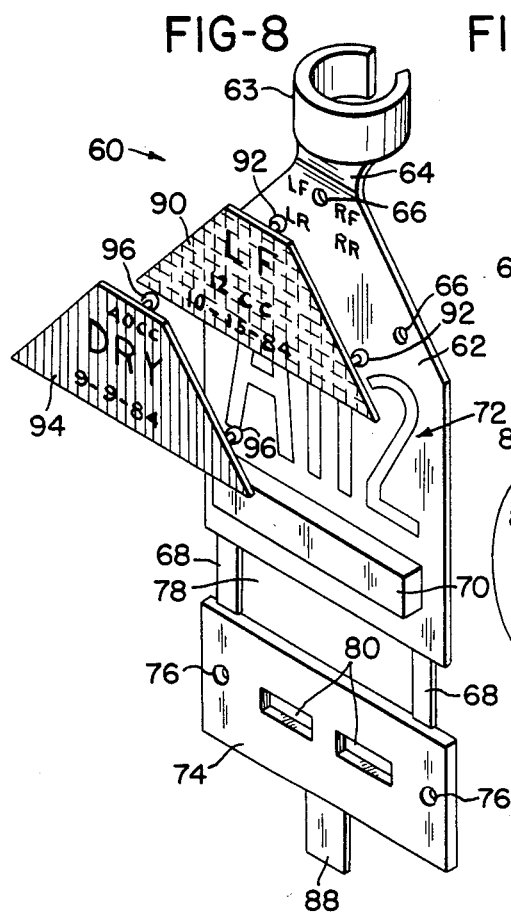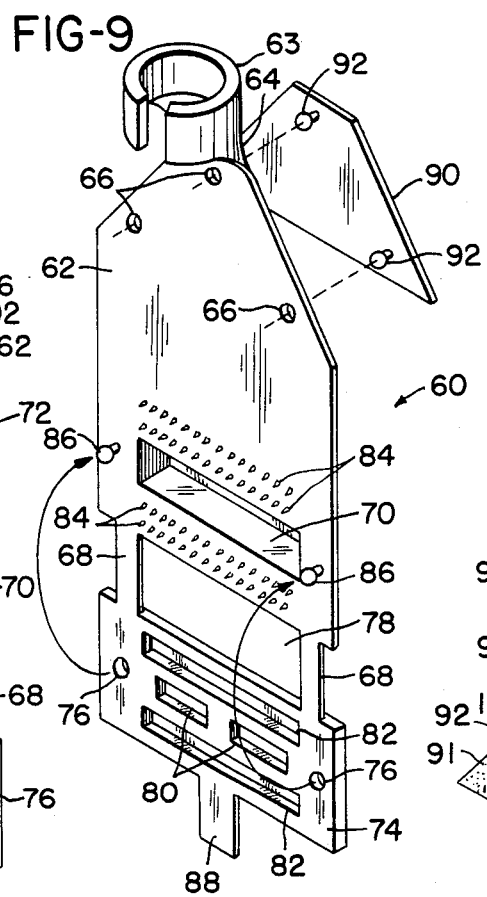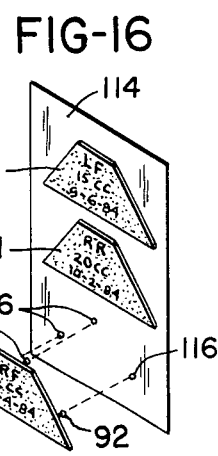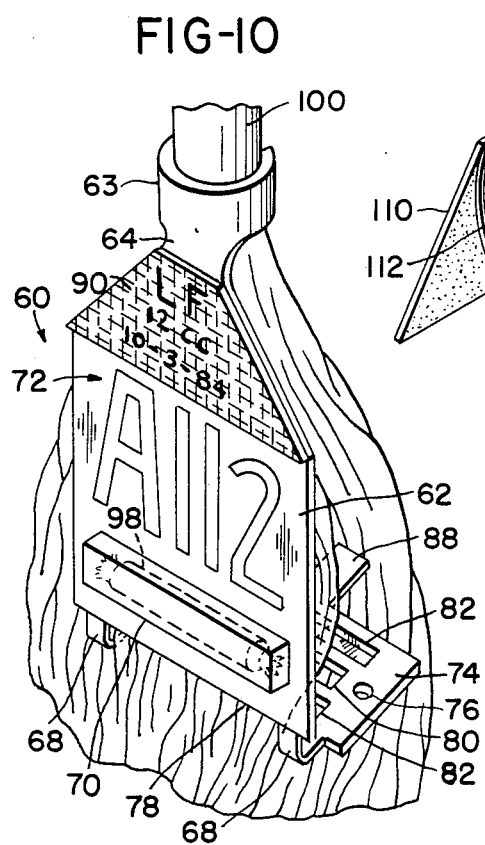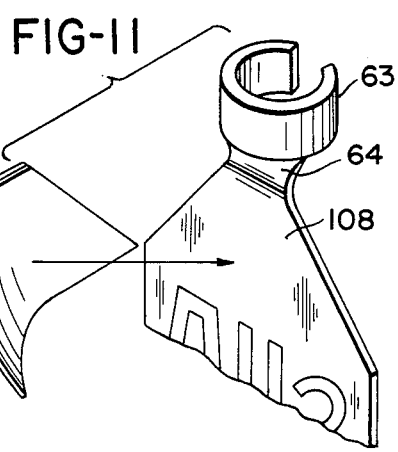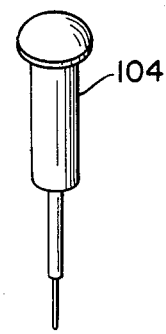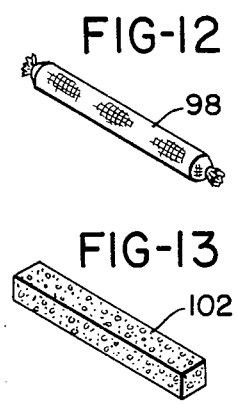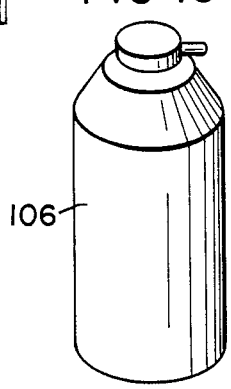

LIVESTOCK TAIL DATA INDICATOR

BACKGROUND OF THE INVENTION

1. Field of the Invention

This invention relates to indicators adapted to be attached to the tails of livestock such as cattle for identification and treatment purposes. More particularly, it relates to an indicator adapted to contain information relating to the history of medication given to the particular animal, for example, cow, treated, plus means for controlling flies and other insects or pests which infest cattle and other animals, particularly dairy cattle, all conveniently assembled as a kit.

2. Description of the Prior Art

Much fresh milk has to be dumped almost daily because of containing levels of antibiotic which make it unsafe for human consumption. This results from dairy workers who accidentally put milk in the tank which comes from a cow which has been treated with an antibiotic to mastitis or other disease. This is because the milker either does not know that the cow has been treated because of her having been milked at an earlier milking by someone else or because he forgets that she has been treated. Markers are known for identifying cows by number and for treating them with insecticides. However, as evidenced by patents which teach such, specifically U.S. Pat. No. 3,900,981, British Pat. No. 1,111418 (complete specification published Apr. 24, 1968) and Deutsches Patentamt Offenlegungsschrift No. 2331283 (Offenlegunstag 9/1/75), all of which are in some way related to marking or treating cows, no art seems to teach providing a tail data indicator which insures that a milker will not save contaminated milk because of having sure identification of a treated cow but also prevents accidental detaching of the marker by continued swishing of the cow's tail while at the same time enabling an insecticide or pest control agent or the like to be applied therefrom by such swishing.

SUMMARY OF THE INVENTION

After extended investigation I have found that these desired results may be accomplished by providing a plastic indicator which has securing fasteners at both ends thereof and means for identifying treated cow. By plastic I mean to include synthetic polymers and the like as well as natural and synthetic rubber. When in the form of or a part of a kit my tail data indicator may also have in addition to separate components thereof or parts which may be applied thereto such as absorbent material for application thereto of an insecticide, for example, permethrin, or a capsule containing an insecticide with an easily rupturable coating, both adapted to be placed in a rectangular or like compartment on the indicator, a marker for use in applying treatment and other data to the indicator, as well as other treatment and identifying aids, although data may also be preprinted, applied by way of raised letters or numbers, stamped, impressed or otherwise marked on the indicator, preferably in a textured or other reflective or fluorescent manner. As a part of the kit of the invention according to another embodiment, a syringe and small bottle or like container of insecticide or an aerosol can for applying the insecticide to the aforesaid absorbent material may be supplied.

The fastener at one end, the upper or top end when the data indicator is fastened on the tail of a cow or other animal so that one can read it rightside up, may be of the snap-tight or lock-band type for encircling the tail. By snap-tight I mean circular or ring-like, except for not quite forming a complete circle in order to leave room for the two ends to meet or almost meet as a circle or ring when pressed around the tail near its bushy end. By lock-band I mean a strap or band, for example, of cloth or plastic, which fits through two slits in said one end of said indicator, on around the cow's tail at the same part near the bushy end thereof and through a locking housing which has an angled locking tab to prevent rearward movement of the strap or band and unlocking thereof. The fastener at the other end of the tag is made up of two parallel members hinged together and adapted to be folded together together and hooked together by studs which fit into holes in the mating member.

Although the data may be marked directly on the face of the indicators, I prefer to include in the kit plastic or like labels or stickers for application to the indicators via studs on the labels and holes in the indicators or an adhesive backing or the like. The marker in the kit is for indicating on the labels or stickers or directly on the surface of the indicators data such as treatment date, amount of antibiotic used, the quarter or quarters treated or the like. The labels are preferably made reflective so that they may be seen at night or in the dark. The data may be marked directly on the indicator with the marker, if one is furnished in the kit, or by whatever instrument the dairyman or livestock farmer prefers.

My treatment indicator stickers or labels for attachment to the data indicators of the inventor are preferably color coded to show whether a cow is dry or lactating, for example by having at least a part of the sticker or label yellow or some other color to indicate a treated lactating cow and a different color such as red to indicate a dry, non-productive cow. Instead of marking the treatment data directly on space provided on the indicator elsewhere I prefer to mark the data on the color coded labels or stickers. If desired, an A to Z number or the like may be permanently marked either directly on the indicator or on the label or sticker, or on both. I prefer, however, to permanently premark an identification number, for example, toward the bottom of the indicator and to permit the herdsman to use a marker to add any treatment data he may wish to directly on the label or sticker.

A data sheet with holes for insertion of the studs on the labels therein is also preferably included in my data indicator kit.

Both my data indicator and the labels or stickers that go thereon may be made of a polymer such a nitropolyethylene, for example.

BRIEF DESCRIPTION OF THE DRAWING

For a better understanding of my invention reference will now be made to the drawing which forms a part hereof and represents a preferred embodiment of the invention.

In the drawing,

FIG. 1 is a schematic showing of an indicator according to the invention attached to the end of a cow's tail.

FIG. 2 depicts the cow data indicator of the invention in kit form, showing the components separately of one embodiment thereof.

FIG. 3 depicts a similar kit with the indicator turned around to show the other side and without one of the stickes and without a marker.

FIG. 4 is a longitudinal cross section of an upper fastener in an embodiment wherein it is not a part of the indicator itself but a separate piece.

FIG. 5 is a section of a fastener such as that of FIG. 4 of the lock-band type looking endwise through the locking housing thereof, taken at 5—5 of FIG. 4.

FIG. 6 is a schematic showing similar to that of FIG. 1 except that it shows an embodiment of the indicator of the invention on a cow's tail attached at the top by a snap-tight fastener instead of a lock-band fastener.

FIG. 7 shows separate sticker and indicator components of the livestock data indicator of the invention as they would be found in a kit.

FIG. 8 is a front view of the livestock tail data indicator of the invention according to an embodiment in which the fastener at the end of the indicator opposite the snap-tight or lock-type fastener end includes an insecticide applicator compartment on the front or data-containing surface thereof and has a colored lactating cow sticker or label shown adapted to be placed on said front or data-containing surface (yellow) and also a dry cow sticker (red) similarly shown.

FIG. 9 is a rear view of the indicator shown in FIG. 8 except for having a rear view of only one sticker or label shown with studs thereon.

FIG. 10 depicts an indicator of the embodiment shown in FIGS. 8 and 9 being installed on a cow's tail with hairs being pulled through an opening in a hinge porton of the lower fastener and a lactating cow sticker or label adhered thereto and having data thereon.

FIG. 11 is a representation of a broken-way portion of an identification marker or data indicator according to the invention showing an adhesive-backed sticker or label being applied to the front luminescent surface thereof.

FIG. 12 shows an insecticide-containing capsule adapted to be placed in a compartment of the indicator of the invention according to one embodiment of the invention.

FIG. 13 depicts a piece of absorbent or absorbent material adapted to be treated with insecticide and placed in a compartment on the data indicator of the invention according to another embodiment of the invention.

FIG. 14 is a schematic illustration of a syringe such as may be included in the data indicator kit of the invention for adding insecticide to the absorbent material adapted for use in a compartment on the indicator according to one embodiment of the invention.

FIG. 15 is an aerosol can which may included in the kit of the invention and may alternatively be simply a container for insecticide to be added to an absorbent to be used in the compartment on the indicator if the container depicted is not an aerosol can which contains insecticide.

FIG. 16 depicts a record sheet with two of three labels adhered thereto and the third ready to be applied via studs on the back of the labels and holes in the sheet, the sheet being representative of those one or more of which may be included in a kit containing a livestock data indicator according to the invention together with one or more additional components.

DETAILED DESCRIPTION OF THE INVENTION

Figure 17:
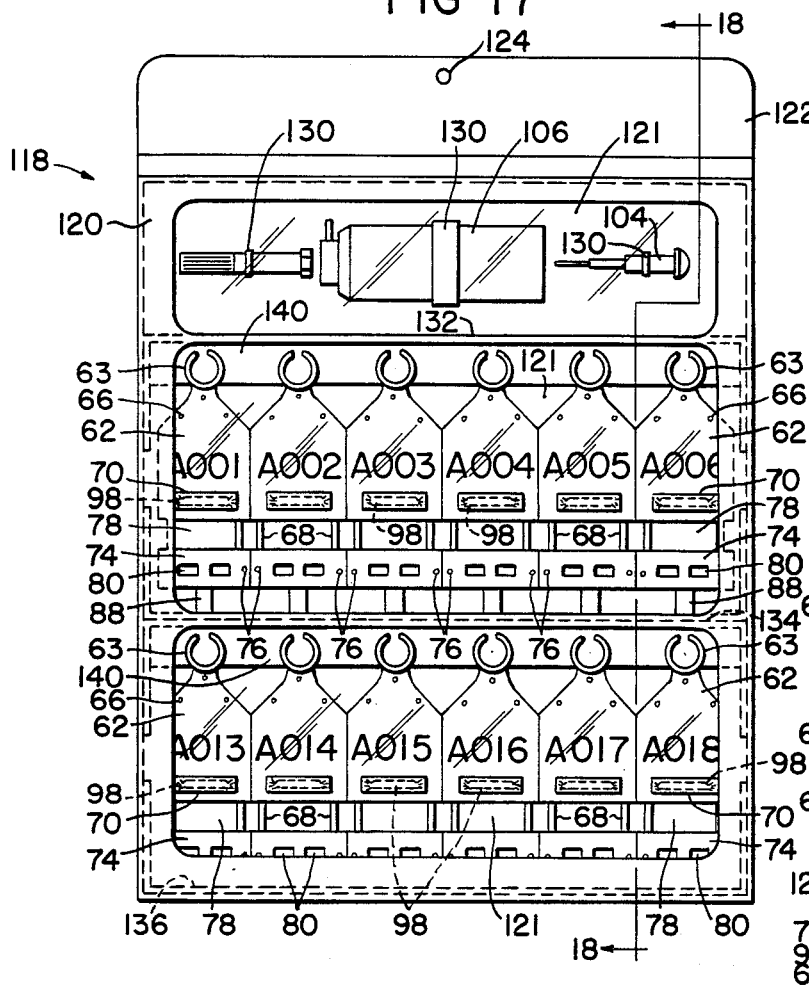
FIG. 17 is illustrative of a package kit containing representative components of the data indicator kit of the invention shown from one side thereof, said kit having a clear plastic-type sealed cover such as used in grocery item packaging or nails or screw or other hardware item packaging.

In FIGS. 1-7, to be referred to first generally herein, the letter A indicates an alternate or slightly different embodiment of the part shown by the number with which it is used, or the use of the same part in a slightly different embodiment. The data indicator of the invention fastened to the end portion of tail 10 is referenced by the number 12. The tag 14 is fastened to the tail 10 at the upper end by a lock-band fastener 20 or a snap-tight fastener 50, which may also be referred to as a spring-clip fastener to understand how it sprngs together so that its ends meet or almost meet when pressed with one's fingers to fit tightly around the tail 10 but not too tight to slow or stop circulation of injure of hurt the cow or other animlal on which used. At the lower end the tag 14, parallel members 16 and 18 hold hairs of the bushy end of the cow's tail 10 therebetween while at the same time keeping the tag anchored to the tail 10 via its hairs and studs 36 which fit into holes 38, thereby preventing it from coming off even if the upper fastener 20 or 50 should come loose. Upper fastener 20 comprises a lock band or draw band 25 with perforations 26 therein, a locking housing 22 with a groove 23 and locking tab 24 and two slits 40 at the upper end of tag 14 for passing the band 25 therethrough from one side thereof to the other and back. Thus, according to this embodiment of the invention, upper fastener 20 is a separate piece except for slits 40 and according to another upper fastener 50 is not a separate piece but a part of indicator 14 at point 52.

Respective yellow and red, or like, contrasting colored stickers or labels 28 and 30 may be used to indicate lactating and dry cows, respectively. They are preferably attached to the indicator by studs 32 which fit into holes 34 in data indicator 14 but may be adhesively adhered to indicator 14, for example, by a peel-off paper, adhesive backing 110 (see FIG. 11) label. Members 16 and 18 may have teeth 42 to aid in hinging the lower fastener via parallel members 16 and 18.

The lower fastener comprises the aforementioned parallel members 16 and 18, which may be folded together via one or more flexible joining parts or hinges 19 to hold hairs therebetween as shown in FIG. 1 and as indicated by arrow 44 in FIG. 3.

When part of a kit, the cow treatment data tail indicator of the invention may also have a marker such as a pen, pencil or other suitable marking material or instrument 54 for marking treatment date and dosage and quarter treated and any other data desired thereon or on stickers or labels 28, 30 attachable to or attached to tag or indicator 14.

With reference now specifically mostly to FIGS. 8 through 19, which show alternate embodiments of the invention, the snap-tight fastener 63 is shown having a wide neck 64 to prevent the indicator from being accidentally torn from the tail at that point.

The livestock data indicator or tag assembly, including the labels or stickers 90, yellow for a lactating cow, and 94, red for a dry cow, all preferably textured or otherwise made or treated so as to be luminescent or fluorescent so that they may be seen at night or in the dark, as indicated by 91 in FIG. 16, and having preferably studs 92 and 96 for placement in holes 66 of the indicator, is indicated generally by the number 60. Livestock tail data indicator 62 comprises an upper fastener 63 of the circular snap-tight variety and a lower parallel-membered fastener 74 hinged at 68. Lower hinged fastener 74 has a pull tab 88 for aiding in hinging it closed via holes 76 and studs 86 on the back side of the indicator 62. Permanently applied characters 72 may be used on the indicator 62 for numbering or otherwise identifying the particular animal. Rectangular compartment 70 may be included on the front of indicator 62 for insertion therein of an insecticide-containing capsule 98 (FIG. 12) or absorbent material 102 (FIG. 13) treated with insecticide applied from a syringe 104 (FIG. 14) and obtained from a container of insecticide 106, which may be an aerosol can of insecticide if it is desired to spray the insecticide on absorbent 102 instead of applying it by means of a syringe included in the kit of the invention. Aerosol can with insecticide 106 or bottle or container 106 with insecticide is shown in FIG. 15. In FIG. 16 reflective sticker or label 91 containing treatment data as to the right front quarter of a dairy cow (RF) having been treated with antibiotic, for example, in the amount of 12 cubic centimeters (cc) on 10/4/84 may be fastened to record sheet 114 via studs 92 on the back of the sticker or label 91 placed in holes 116 in the sheet 114. Two other similarly marked reflective stickers or labels 91 are shown already adhered to sheet 114.

Upper fastener 63 is attached continuously with the rest of indicator 62 by way of a wide neck 64. Compartment 70 on indicator 62 is adapted to contain either an insecticide-containing capsule 98 or an absorbent material 102 treated with insecticide, as already indicated hereinabove. The lower fastener of the indicator 62 may have various-shaped openings therein in its lower parallel member so that tail hairs may be placed therethrough before folding the two parallel members together via hinges 68 and holding them securely together by way of studs 86 on indicator 62 placed into holes 76 in the lower parallel member of the bottom fastener. The opening between lower parallel member 74 and the upper part of indicator 62 also considered as the upper parallel member of the lower or bottom fastener of the indicator 62 is designated by number 78. The aforementioned openings for tail hairs in the lower parallel member at the bottom end of indicator 62 are indicated by numbers 80 and 82. (See FIG. 9) Rows of pointed elements 84 on the back side of the upper parallel member or the lower part of the main portion of indicator 62 help to hold the upper member and lower member tight when they are folded or hinged together, for example, by using tab 88.

In FIG. 10, shown cut-away is a cow's tail around which upper fastener 100 extends with the bushy hair portion of tail 100 extending downward therefrom mostly behind data indicator 62. Lower parallel member 74 is therein shown being folded or hinged upward to be fastened against the upper parallel member or lower part of the upper section ot top part of indicator 62 from the position shown in FIG. 11.

In FIG. 11 is depicted an embodiment of the invention in which a strip of peel-off paper is pulled off of the back of adhesive-backed label or sticker 110 before applying the label or sticker 110 to the front face of data indicator 108. As may be seen by this application no holes in indicator 108 are required in this instance.

In FIG. 17 representative components of the tail data indicator kit 118 of the invention are seen therein through a clear plastic see-through window 121. The kit 118 has an outer boxlike structure 120, but the exact structure is not critical. A mirror image back side 119 is shown for a part of the package or kit 118 at 123. The back panel of kit 118 is indicated as 122. Indicator kit 118 may have a hole 124 in the top of back panel 122 for hanging it up.

Figure 18:
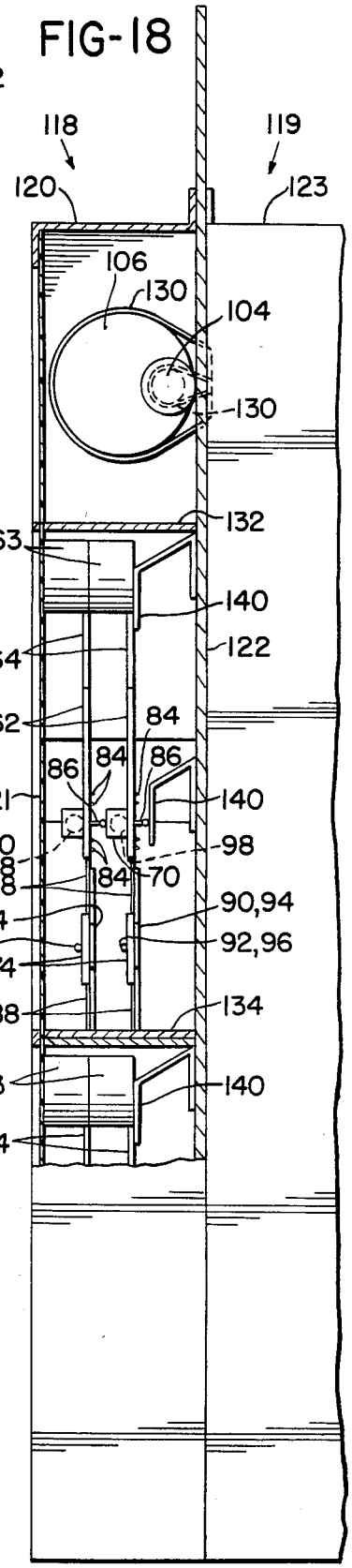
FIG. 18 is a section through the kit at 18—18 showing the contents on one side only, the other side being preferably a mirror image.
Figure 19:
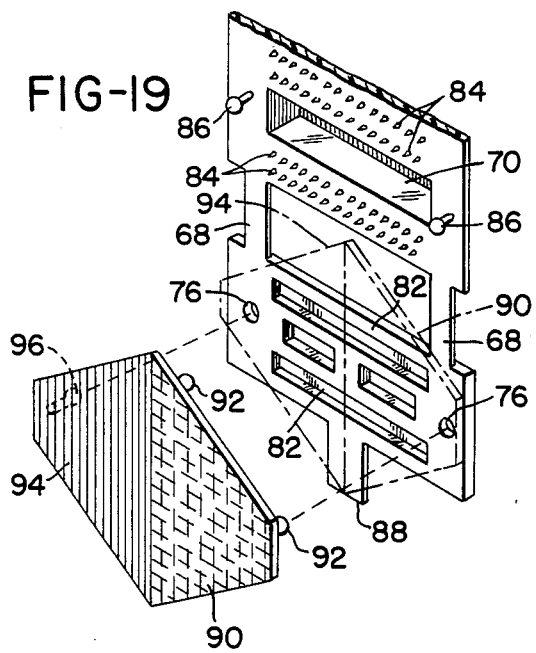
FIG. 19 is a fragmentary view showing how labels or stickers either already marked with data or adapted to be marked with data may be joined to a surface of a data indicator via studs and holes for packaging in a kit such as shown in FIG. 17, with the labels or stickers to be removed and reapplied elsewhere on the indicator before it is used to identify a cow and her treatment.

In FIG. 18, a section through kit 118, may also be seen straps 130 which may be used for mounting aerosol can 106 and biasing flap 140 for the stickers or labels 90, 94. The kit 118 may be divided into respective upper, middle and lower partitions 132, 134 and 136.

While the invention has been described in terms of preferred embodiments, the claims appended hereto are intended to encompass all embodiments which fall within the spirit of the invention.

Having thus described my invention and certain preferred embodiments thereof,

I claim:

1. A livestock treatment tail data indicator comprising a tag which has at one end thereof a first fastener adapted to encircle a tail, at the other end thereof a second fastener having two substantially parallel plastic members which have at least one opening therebetween in a plane therewith and are joined together by plastic hinges substantially perpendicular thereto and integral therewith, said members being adapted to be folded and held together by means of studs on one of said members which fit into holes on the other so as to secure hairs of the bushy end of said tail therebetween and sufficient space on the face of said indicator for visibly placing treatment data thereon in addition to other identification.

2. The indicator of claim 1 wherein said tag has data thereon.

3. The indicator of claim 1 wherein said first fastener is a lock-band fastener.

4. The indicator of claim 1 wherein said first fastener is a snap-tight fastener.

5. The indicator of claim 1 made of plastic.

6. The indicator of claim 1 having a label containing said treatment data on said space on said face of said indicator.

7. The indicator of claim 1 having thereon a compartment for inclusion of insecticide.

8. The indicator of claim 7 wherein said compartment contains means for dispersing insecticide.

9. The indicator of claim 7 wherein said compartment contains an easily fracturable capsule of insecticide.

10. A kit comprising a tag which has at one end thereof a first fastener adapted to encircle a tail, at the other end thereof a second fastener having two substantially parallel plastic members which have at least one opening therebetween and are joined together by plastic hinges substantially perpendicular thereto and integral therewith, said members being adapted to be folded together by means of studs on one of said members which fit into holes on the other so as to secure hairs of the bushy end of said tail therebetween and sufficient space on the face of said tag for visibly placing treatment data thereon in addition to other identification, and a cover encompassing said tag.

11. The kit of claim 10 wherein said kit includes at least one marker for placing data on said space on said face of said tag.

12. The kit of claim 10 wherein said kit contains a record sheet with holes therein and at least one label with studs thereon adapted to fit into said holes in said record sheet.

13. The kit of claim 10 wherein said tag has a compartment thereon having an easily fracturable capsule therein containing insecticide.

14. The kit of claim 10 wherein said tag has a compartment thereon and said kit includes a piece of absorbent material and an aerosol can of insecticide for applying insecticide to said absorbent material.

15. The kit of claim 10 wherein said tag has a compartment thereon and said kit includes a piece of absorbent material and a syringe and bottle of insecticide for application to said absorbent material.

16. The kit of claim 10 wherein said tag has a compartment thereon having therein an absorbent material treated with insecticide.

17. The kit of claim 10 wherein said kit includes at least one label for indicating whether a cow is dry or lactating.

18. The kit of claim 17 wherein said at least one label is color-coded to indicate a dry or lactating cow.

19. The kit of claim 17 wherein said at least one label is reflective in the dark.

20. The kit of claim 17 wherein said at least one label has studs thereon and said tag has holes therein for attachment of said label to said tag through fitting said studs in said holes in said tag.

* * * * *